S. P. EDMONDS.
LIFE SAVING APPLIANCE.
APPLICATION FILED DEC. 4, 1912.
Reissued Dec. 31, 1912.
13,503.
2 SHEETS—SHEET 1.
FIG. 1.
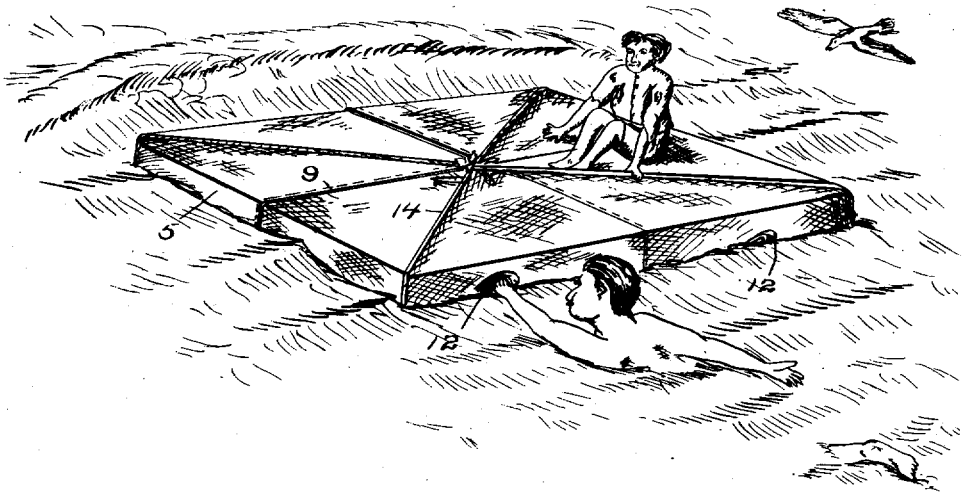
FIG. 2.
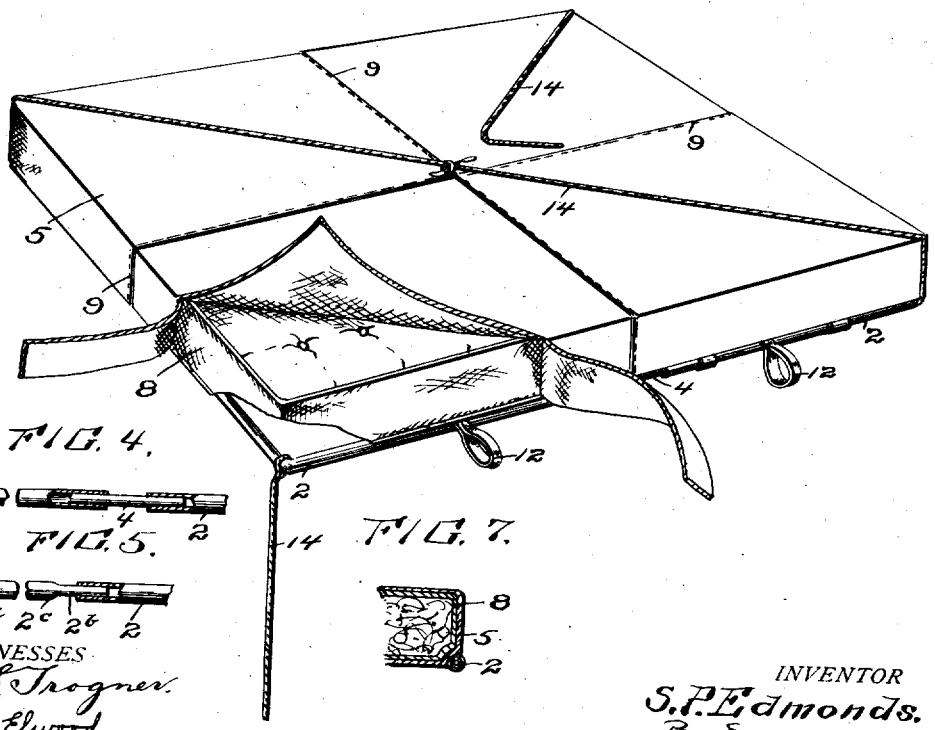
FIG. 4.
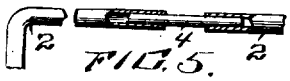
FIG. 5.
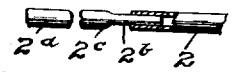
FIG. 7.
WITNESSES
R. S. Trogner.
M. E. Elwood
INVENTOR
S. P. Edmonds.
By Eugene E. Brown
Attorney
COLUMBIA PLANOGRAPH CO., WASHINGTON, D. C.

S. P. EDMONDS.

LIFE SAVING APPLIANCE.

APPLICATION FILED DEC. 4, 1912.

Reissued Dec. 31, 1912.

13,503.

2 SHEETS—SHEET 2.

WITNESSES
R. S. Trogner.
M. E. Elwood

INVENTOR
S. P. Edmonds.
By Eugene C. Brown
Attorney

COLUMBIA PLANOGRAPH CO., WASHINGTON, D. C.

UNITED STATES PATENT OFFICE.

SAMUEL P. EDMONDS, OF CATONSVILLE, MARYLAND.

LIFE-SAVING APPLIANCE.

13,503. Specification of Reissued Letters Patent. Reissued Dec. 31, 1912.

Original No. 1,045,882, dated November 26, 1912, Serial No. 704,129. Application for reissue filed December 4, 1912. Serial No. 734,862.

*To all whom it may concern:*

Be it known that I, SAMUEL P. EDMONDS, a citizen of the United States, residing at Catonsville, in the county of Baltimore and State of Maryland, have invented certain new and useful Improvements in Life-Saving Appliances, of which the following is a specification.

My invention relates to life-preserving apparatus and more particularly to mattresses which may be regularly used upon the bunks and beds on ship-board and are ready to be thrown overboard at any time to serve as floats.

The object of my invention is to provide a mattress which may be used in the ordinary manner upon the beds of a ship but which will be water-proof and will be able to sustain several persons when used as a float.

Many mattresses of felt and other materials which are now in common use are sufficiently buoyant, and another object of my invention is to provide adjustable frames and sectional water-proof and fire-proof covers applied to said mattresses for the purpose of adapting them to be employed as floats.

These and other objects will appear from the following description in connection with the accompanying drawings in which—

Figure 3:
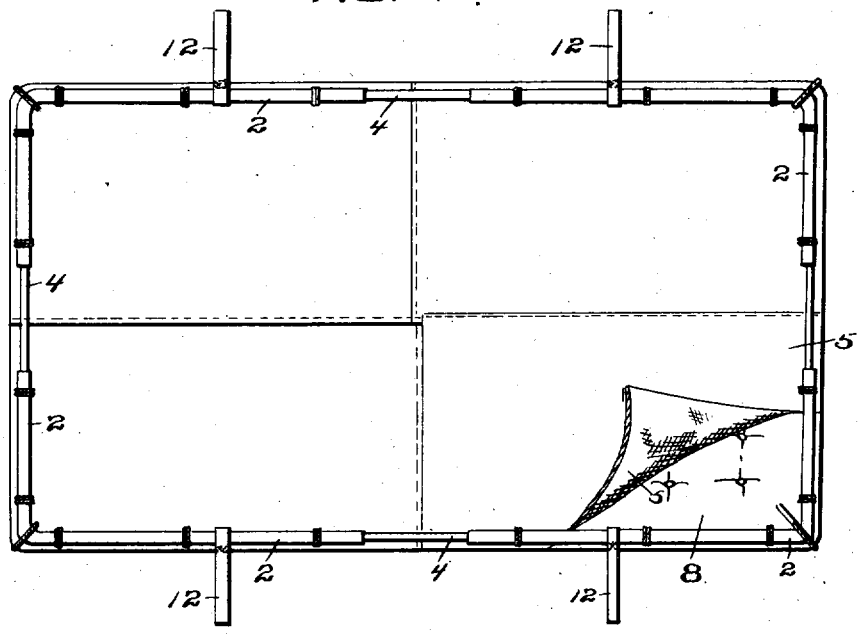
Figure 6:
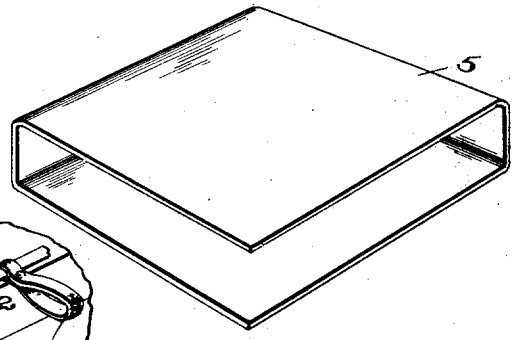
Figure 8:
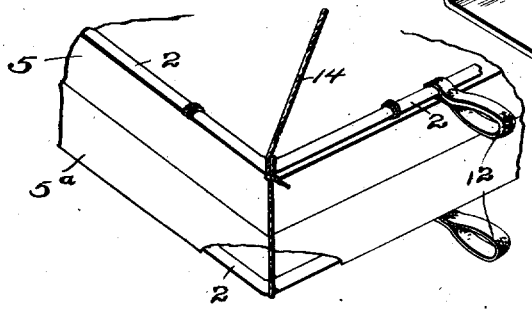

Figure 1 is a perspective view of a mattress embodying my invention and showing its use as a life-preserving float; Fig. 2, is a perspective view of the same with a portion of the cover opened out to expose the mattress and metal frame; Fig. 3, is a bottom plan view of my life-preserving mattress with one cornor of the cover turned back to expose the inner mattress; Figs. 4 and 5 are detail views of the adjustable frame; Fig. 6, is a perspective view of one of the sectional covers; Fig. 7, is a detail showing one end of the mattress and frame in section; and Fig. 8 is a fragmentary perspective view showing the manner of combining two mattresses to form a rigid float.

Many mattresses of felt and other materials now in use possess sufficient buoyancy to be used as floats, but they are not entirely water-proof and are not sufficiently rigid. My present invention provides an extensible frame which may be adjusted to fit any size of mattress, and will render the same sufficiently rigid to maintain its normal shape when employed as a float, and yet will not interfere in any manner with the ordinary use of the mattress upon a bunk or bed. I also provide a sectional water-proof fabric casing or covering which may be readily secured to the mattress. The frame is preferably made of metal and is formed in four angular sections, each of which extends along two bottom edges of the mattress. Each section is preferably formed of a tube 2, bent at a right angle, the several sections being joined by connecting rods 4. I prefer to make the joints rigid by shrinking the tubes upon the rods 4. Two of the sections may have the rods fastened into them at the factory and the frame may be assembled by heating the ends of the other sections to expand them and then, after proper adjustment to the desired size, permitting the tubes to cool and shrink tightly over the rods. In this manner an exceedingly strong and rigid frame is formed without any parts which are liable to become displaced. The connecting joint rods 4 may be dispensed with by forming two of the sections of tubes having a diameter slightly smaller than the other sections as illustrated in Fig. 5, so that, by heating the larger tubes 2, the sections $2^a$ will telescope therein to form a rectangular frame, the shrunken joints forming a rigid structure as in the form previously described.

Under some conditions it may be desirable to make the joints freely separable. For this purpose the form shown in Fig. 4 is preferable, the rods 4 being secured by shrinking or other manner in two of the sections and the bore of the other sections being made to slide over the rods. In order that the frame may be sufficiently rigid the tubes 2 are made to abut. With this type it is preferable to make the tubes 2, slightly longer than the required length and to cut off short lengths as they are being assembled thereby insuring an accurate adjustment, since the rigidity depends upon the abutment of the tubes when sliding joints are employed.

The form shown in Fig. 5 can also be used as a loose sliding joint, one end of each frame member being preferably made smaller, as at $2^b$ and the end of the telescoping member bearing against the shoulder $2^c$, so that the assembled frame will be sufficiently rigid at the joints. If the joints shown in Fig. 5, are to be fitted by first expanding one of the members by heating, it will be unnecessary to reduce the end of the smaller pipe, which is very slightly smaller in diameter and when the parts have cooled the frame will be absolutely rigid and immovable.

The metal frame may be secured to the cover 5 by means of heavy sail twine, cords or other fastening means, at the bottom edges of the mattress 8, and the latter naturally will yield somewhat so that the metal frame will be practically embedded within the contour of the mattress as illustrated in Fig. 7, or the metal frame may be inside of the ticking or the cover. The stiffening frame will, therefore, not interfere in any manner with the use of the mattress upon a bed or bunk. By placing the frame at the bottom of the mattress, secured to the cover either inside or outside, the entire bottom sheet of the cover can be drawn taut, thus forming a substantially flat unyielding base or support for the mattress which cannot sag, a very important feature when the float is launched upon the water.

For the purpose of making the floatable mattress water-proof so that it may serve as a life-preserving float and also fire-proof so that it may not be set on fire by accidental means, as for instance, by a lighted cigar, cigarette or match carelessly dropped thereon by a passenger or sailor, I provide a covering 5, of water-proof and fire-proof fabric which may be prepared by any of the well known processes.

As previously stated, I prefer to construct the frames and covers in sections so that they may be shipped from the factory and afterward assembled and adjusted to fit the mattresses upon ship-board or other convenient place. The cover-sheets 5 may be made in quarter-sections as shown in Fig. 6, of the proper shapes and size to slip over the mattress, the four sections being sewed tightly together along the seams 9, as shown in Fig. 2. The sectional cover members are made slightly larger than will be necessary to allow for trimming to an accurate fit upon the mattress. I have found that the seams may be made practically water-tight so that the incased mattress will be water-proof. Each sectional cover-sheet may be secured to a sectional frame-member 2, by means of heavy sail twine, if desired, before they are shipped from the factory. The frame may be secured either to the outside or to the inside of the cover sheet. In Fig. 8, I have shown, for purposes of illustration, the frame 2 of the upper section upon the outside of the cover, while in the lower section $5^a$, the frame is within the cover sheet and is secured in the corner thereof. New mattresses may be constructed with water-proof ticking, thus eliminating the necessity for an auxiliary outside cover, and the ticking may then be secured directly to the stiffening frame, the latter being preferably outside of the ticking, which will constitute the water-proof envelop.

When my water-proof float is brought into use as a life-saving appliance, it is necessary that it should be easily handled and also that means should be provided for readily grasping it and securing a firm hold thereon, and I have, therefore, provided loops or flexible handles 12, which are fastened to the stiffening metal frames. In order that there may be means for securing or lashing the bodies of those who are upon the float so that there may be no danger of being thrown or washed off, I provide ropes 14, preferably attached to the corners of the metal frame, which may be carried over the top of the float and lashed about the persons thereon.

It will be appreciated by naval engineers and others experienced in seamanship that a float must be sufficiently rigid to maintain its shape when subjected to very unequal strains and must be able to resist the tendency to buckle or fold. While the single float above described will be sufficient under ordinary circumstances, my invention contemplates the construction of a duplex type of float which will be able to resist greater strains without distortion and which is metal-bound or metal-rimmed upon both sides.

In Fig. 8, I have illustrated the manner of assembling my duplex type of float. Two of my framed single mattress-floats are placed together with the metal frames upon opposite sides so that one will be at the top and the other at the bottom of the float. I have shown the upper frame upon the outside of the cover 5, while the lower frame is inclosed within the cover $5^a$, a portion of the cover being broken away to show the frame secured in the corner thereof. The corners are then bound to each other by means of the ropes 14, of the lower frame, being drawn very tightly together so that their unframed yielding upper surfaces close together into a practically water-tight buoyant body. The ropes 14 of the upper member may then be crossed over the duplex float and used to lash the bodies of the persons upon the float. The duplex float constitutes, therefore, a water-proof buoyant body bound together upon the outside edges of both sides by the metal frames which coöperate to form an exceedingly rigid and unyielding framework.

I have set forth in detail the structural features illustrated in the accompanying drawings for the purpose of disclosing an embodiment of my invention, but it is evident that various changes may be made therein without departing from the spirit of my invention. Each duplex float may be used as a unit to form larger floats or rafts when lashed together by the corner lashings.

I claim:

1. A life-saving mattress comprising a buoyant and resilient body portion having an envelop, a stiffening or bracing frame secured thereto along the bottom edge and exterior of the envelop, and forming a rigid marginal reinforcing member upon the bottom thereof, and holding the same taut across the entire bottom of the body portion, thereby preventing any sagging thereof.

2. A life-saving appliance comprising a buoyant and resilient body portion having a water-proof envelop, a metal stiffening or bracing frame secured thereto along the bottom edge thereof, and forming a rigid marginal reinforcing member upon the bottom and exterior of the envelop, and holding the same taut across the entire bottom of the body portion, thereby preventing any sagging thereof.

3. A life-saving appliance comprising a buoyant and resilient body portion having a water-proof envelop, a metal stiffening or bracing frame secured thereto, said frame having telescoping sections and forming a rigid marginal reinforcing member upon one side thereof, and lashing devices secured to said frame.

4. An adjustable reinforcing frame and envelop for attachment to the buoyant body portion of a life-saving appliance, comprising sectional metal frame members having telescopically coöperating ends, and sectional envelop members of water-proof fabric secured to said frame members.

5. An adjustable reinforcing frame and envelop for attachment to the buoyant body portion of the life-saving appliance, comprising sectional metal frame members having telescopically coöperating ends, sectional envelop members of water-proof fabric secured to said frame members, loop hand-holds and lashing devices carried by said frame members.

6. A duplex life-saving appliance, comprising a buoyant, flexible body portion, a water-proof envelop therefor, and marginal reinforcing frames secured to the top and bottom edges thereof.

7. A duplex life-saving appliance, comprising a buoyant, flexible body portion, a water-proof envelop therefor, marginal reinforcing frames secured at the top and bottom edges of said body portion, means for securing said frames together, and lashing devices attached to said frames.

In testimony whereof I affix my signature in presence of two witnesses.

SAMUEL P. EDMONDS.

Witnesses:

EUGENE C. BROWN,

M. E. ELWOOD.

Copies of this patent may be obtained for five cents each, by addressing the "Commissioner of Patents, Washington, D. C."